United States Patent

[11] 3,624,437

[72] Inventor Alfred Hoyler
Stuttgart, Germany
[21] Appl. No. 107,364
[22] Filed Jan. 18, 1971
[45] Patented Nov. 30, 1971
[73] Assignee Robert Bosch GmbH
Stuffgart, Germany

[54] EDDY CURRENT BRAKE
10 Claims, 4 Drawing Figs.
[52] U.S. Cl. .................................................. 310/93, 310/53, 310/94
[51] Int. Cl. ........................................................ H02k 49/04
[50] Field of Search ............................................ 310/92, 93, 94, 96, 53

[56] References Cited
UNITED STATES PATENTS
2,440,551 4/1948 Martin ........................ 310/93

FOREIGN PATENTS
1,174,034 11/1958 France ........................ 310/93

Primary Examiner—D. X. Sliney
Attorney—Michael S. Striker

ABSTRACT: An eddy current brake wherein a cupped rotor surrounds the coil and the pole shoes of the stator and is provided with inlets for admission of cool air when the coil is excited to produce in the rotor eddy currents with attendant generation of heat. The rotor has blades which serve to draw air into an internal rotor chamber and to circulate such air along the surfaces of the stator and rotor when the coil is excited. The inlets are controlled by a valve which is mounted in the stator and is movable between closed and open positions by actuating means which are also mounted in the stator. Such actuating means comprises electromagnets or temperature-responsive devices which employ heat-expandible elements.

PATENTED NOV 30 1971

INVENTOR.
ALFRED HOYLER

BY *[signature]*
Attorney

EDDY CURRENT BRAKE

CROSS-REFERENCE TO RELATED APPLICATION

Certain features of the eddy current brake which is disclosed in this application are claimed in my copending application Ser. No. 111,033 filed Jan. 29, 1971 and entitled "Air-cooled eddy current brake."

BACKGROUND OF THE INVENTION

The present invention relates to improvements in eddy current brakes, especially to improvements in eddy current brakes for use in automotive vehicles. More particularly, the invention relates to improvements in eddy current brakes of the type wherein a rotor surrounds and rotates with reference to the poles of an electromagnet which is installed in the stator and wherein the rotor and the stator are cooled when the brake is in use.

French Pat. No. 1,174,034 discloses an eddy current brake wherein heat which develops on conversion of braking energy is withdrawn by a coolant admitted through an inlet controlled by a valve which is rotatably or axially movably mounted on the hub of the rotor. The valve is actuated by a magnetic ring which shares the movements of the rotor and is turnable with reference to the rotor by the magnetic filed which develops on energization of the coil of the electromagnet on the stator, or by a bimetallic strip which is secured to the rotor and must be heated in order to undergo sufficient deformation to actuate the valve. Since the rotor of an eddy current in an automotive vehicle is subject to repeated acceleration or deceleration which is shared by the valve, the inertia of moving parts often causes the valve to assume positions which are not dictated by the need for a cooling action, i.e., the valve is likely to admit coolant or to prevent admission of coolant at inopportune times to thereby prevent proper cooling or to permit cooling at a time when the cooling action is not needed. The inertia of moving parts is likely to overcome the force of the magnet or to deform (bend or twist) the bimetallic element.

SUMMARY OF THE INVENTION

An object of the invention is to provide an eddy current brake which is particularly suited for use in automotive vehicles and whose cooling system is constructed and mounted in such a way that it is not affected by the inertia of moving parts or by other forces which adversely influence the cooling action in conventional eddy current brakes.

Another object of the invention is to provide an eddy current brake with novel means for actuating one or more valves which control the admission of a fluid coolant into the range of coolant circulating means on the rotor.

A further object of the invention is to provide an eddy current brake wherein the valve or valves which control the admission of coolant to the cooling system need not be mounted on the rotor.

An additional object of the invention is to provide an eddy current brake with novel and improved means for actuating the valve or valves which control the admission of coolant into the range of coolant-circulating means on the rotor.

Still another object of the invention is to provide an eddy current brake wherein the cooling system and the means for actuating the valve or valves of the cooling system occupy little room and can operate independently of all such factors which adversely affect the operation of cooling systems in presently known eddy current brakes.

The improved eddy current brake comprises a preferably annular stator member, a preferably cup-shaped rotor member which is preferably coaxial with and rotates relative to the stator member with one or more parts which must be braked at times determined by the operator of an automotive vehicle, coil means mounted in or on the stator member and energizable by the operator to produce in the rotor member eddy currents with attendant generation of a braking force and heating of the two members, cooling means comprising coolant-admitting inlet means provided on the rotor member, coolant-circulating means provided on and sharing angular movements of the rotor member to circulate along at least one of the two members a coolant which is admitted by way of the inlet means, and valve means which is mounted on the stator member and is movable between open and closed positions in which it respectively permits and prevents entry of a coolant by way of the inlet means in the rotor so that such coolant can flow into the range of the circulating means, and actuating means provided on the stator member and operative to move the valve means between the open and closed positions.

The actuating means may comprise one or more electromagnets and motion transmitting linkages or the like which move the valve means to the open position in response to energization or deenergization of the electromagnets. It is also possible to employ one or more temperature-responsive devices which cause the valve means to open in response to heating of one or more heat-expandable elements. The electromagnets are preferably energized or deenergized and the heat-expandable elements are preferably heated to move the valve means to its open position in response to energization of the coil means on the stator member, i.e., in response to generation of eddy currents. The valve means is preferably moved to its closed position with at least some delay following the deenergization of coil means to insure that the stator member and/or the rotor member is cooled for a fixed or variable interval of time following the termination of a braking action.

The novel features which are considered as characteristic of the invention are set forth in particular in the appended claims. The improved eddy current brake itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
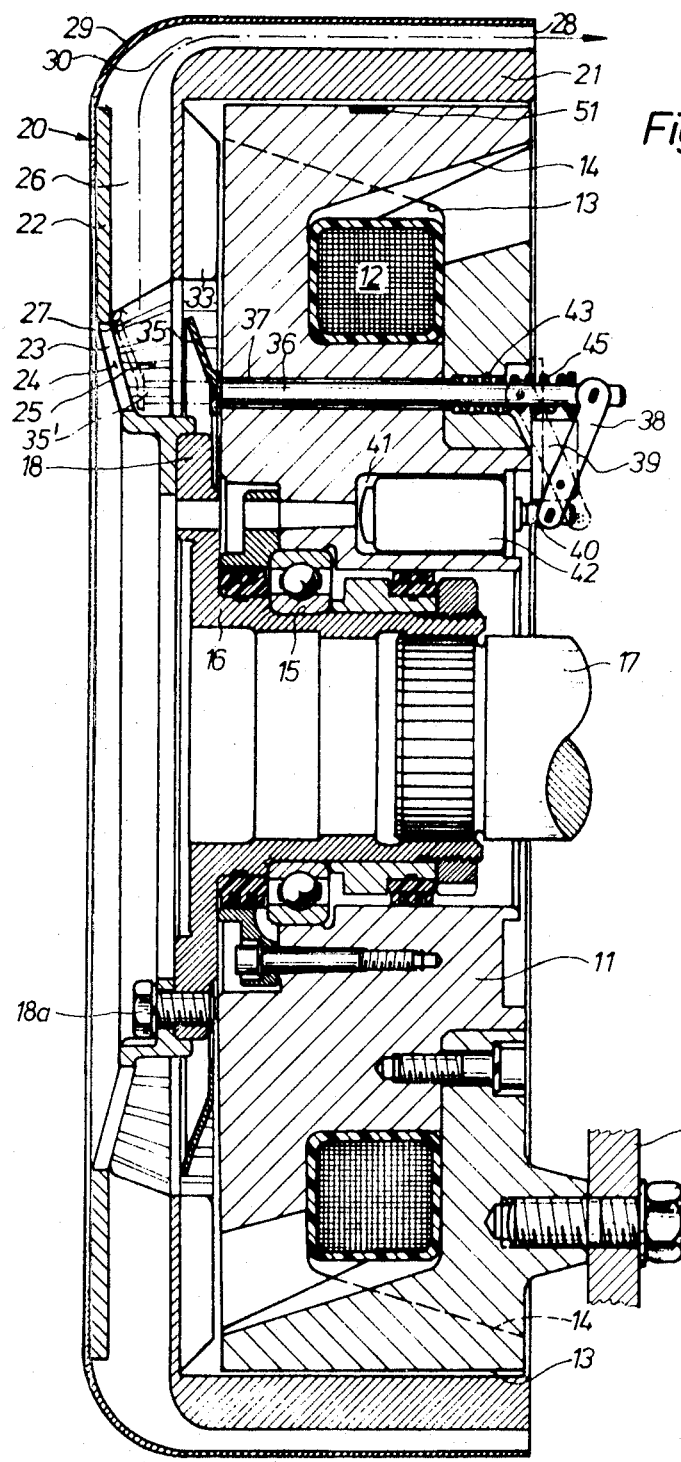
FIG. 1 is an axial sectional view of an eddy current brake which embodies one form of the invention and wherein the actuating means for the valve means comprises several electromagnets which must be deenergized in order to move the valve means to its open position.

FIG. 1 shows an eddy current brake which includes a ring-shaped stator 11 connectable to the housing H of a differential or a transmission in an automotive vehicle by means of bolts F or analogous fasteners. The stator 11 carries a coil 12 and further supports several pole shoes 13, 14 which surround the coil 12 and have interengaging claws which are outwardly adjacent to the coil, as considered in the radial direction of the stator. The central opening of the stator 11 contains an antifriction bearing 15 which is surrounded by a hub or sleeve 16 rotatable with a stub shaft 17 which constitutes that rotary part of the transmission or differential which is to be braked when the coil 12 is energized.

The hub 16 has a radially outwardly extending flange 18 which is secured to a drum-shaped rotor 20 by fastener means 18a. The rotor 20 includes a cylindrical portion 21 which surrounds, with some clearance, the outer faces of the claws of pole shoes 13 and 14. Such outer faces form part of a cylindrical surface. When the coil 12 is excited, it produces a magnetic field which acts on the cylindrical portion 21 of the rotor 20 through the pole shoes 13, 14 and tends to arrest the rotor whereby the latter brakes the shaft 17 through the intermediary of the hub 16. Excitation of the coil 12 results in generation of eddy currents in the rotor 20 and the energy of such eddy currents is converted into heat which is dissipated in accordance with a feature of the present invention.

The rotor 20 further comprises an annular bottom wall or end wall 22 whose central portion is affixed to the flange 18 of the hub 16 by the fastener means and which is provided with several air-admitting inlets or openings 23 adjacent to the flange 18. The inlets 23 are separated from each other by spokes or partitions 24 of the end wall 22. The end wall 22 is further provided with a ring-shaped chamber 25 which can communicate with the atmosphere by way of the inlets 23 and which further communicates with radially outwardly extending passages or channels 26 of the end wall 22. The channels 26 are separated from each other by air-circulating vanes or blades 27 whose aerodynamic design is such that, when the rotor 20 is driven by the shaft 17, the vanes 27 draw air into the chamber 25 by way of the inlets 23 and the vanes 27 thereupon push the thus drawn air from the chamber 25 into the channels 26 and along cooling ribs or fins 28 which extend substantially axially of the shaft 17 and are machined into the external surface of the cylindrical portion 21. The fins 28 define axially parallel flutes or grooves 30 wherein the air flows in a direction to the right, as viewed in the drawing. The fins 28 are surrounded by a cupped shroud 29 which separates the flutes 30 from each other and overlies the outer portion of the end wall 22. The shroud 29 can be made of sheet metal.

The inner side of the end wall 22 is formed with radial air-circulating blades or vanes 33 which extend toward the adjacent end face of the stator 11 and serve to draw some air from the chamber 25 when the rotor 20 is driven by the shaft 17 and the inlets 23 are free to admit cool atmospheric air. Such air then flows through the gaps between the claws of the pole shoes 13, 14 to issue at the right-hand axial end of the stator 11, as viewed in the drawing.

The chamber 25 accommodates a slightly conical ring-shaped axially reciprocable valve 35 which can be moved from the open position shown by solid lines to a closed or sealing position 35' (shown by phantom lines) in which it seals the inlets 23 to prevent admission of air into the chamber 25. The left-hand end surface of the valve 35 is dimensioned in such a way that the valve practically seals the chamber 25 from the inlets 23 when it assumes the phantom-line position 35'.

The actuating means for moving the valve 35 between the open and closed positions comprises a linkage including three equidistant axially reciprocable motion transmitting rods 36 which are parallel to the shaft 17 and are reciprocable in axially parallel bores 37 of the stator 11, and three additional motion transmitting elements 38 each of which constitutes a two-armed lever. The levers 38 are fulcrumed on bearing blocks 39 which are provided on the stator 11 and their longer arms are articulately connected with the exposed ends of the adjacent rods 36. The shorter arms of the levers 38 are articulately connected to reciprocable armatures 40 of three equidistant valve-displacing electromagnets 42 which are installed in recesses or blind bores 41 of the stator 11. The axes of the rods 36 are located on the periphery of an imaginary cylinder which is coaxial with the shaft 17 and with the cylindrical portion 21 of the rotor 20.

The bores 37 for the rods 36 have enlarged outer end portions 43 which receive helical springs 45 each of which bears against the longer arm of the respective lever 38 and tends to maintain the rod 36 in the illustrated position corresponding to the open (solid-line) position of the valve 35. When the electromagnets 42 are energized, the armatures 40 move in a direction to the right, as viewed in FIG. 1, whereby the levers 38 pivot against the opposition of the respective springs 45 and cause the rods 36 to move the valve 35 to the closed or sealing position 35'. It will be seen that, when the electromagnets 42 are deenergized, the valve 35 dwells in the open position in which the inlets 23 can admit air into the chamber 25 of the end wall 22. The arrangement is normally such that, when the electromagnets 42 are energized, the valve 35 is moved to a closed position in which it is closely adjacent to the inlets 23 so that it nearly completely seals the chamber 25 from the atmosphere. The vanes 27 and the blades 33 are then unable to respectively draw air from the atmosphere and from the chamber 25. These vanes and blades become effective as soon as the electromagnets 42 are deenergized so that the springs 45 are free to expand and to return the valve 35 to the solid-line position. The air which is drawn by the vanes 27 into the chamber 25 and is thereupon pushed into the channels 26 and flutes 30 serves to cool the fins 28 and hence the cylindrical portion 21 of the rotor 20. The streams of air which are drawn from the chamber 25 by the blades 33 cool the outer sides of the pole shoes 13, 14, the outer side of the coil 12 and the internal surface of the cylindrical portion 21.

The circuit of the electromagnets 42 is designed in such a way that the electromagnets 42 are deenergized in response to energization of the coil 12. This insures that the blades 33 and vanes 27 are capable of cooling the aforedescribed parts of the brakes when the control system for the electromagnets 42 becomes inoperative or when the source which furnishes electrical energy for energization of the electromagnets 42 is exhausted. Thus, the parts of the brake are invariably cooled when the coil 12 is energized, irrespective of whether the control system for the electromagnets 42 is operative or not because, when the control system is out of commission, the electromagnets 42 are deenergized and the springs 45 are free to maintain the valve 35 in the open position.

In accordance with another feature of the invention, the energization of electromagnets 42 continues for a certain interval following the opening of the circuit of the coil 12. This insures that the vanes 27 and blades 33 can effect complete or substantially complete cooling of the stator 11 and rotor 20 upon termination of the braking action. To this end, the pole face of one of the pole shoes 13, 14 (for example of the pole shoe 14) is provided with a detector here shown as an NTC-resistor 51 whose electrical resistance varies as a function of its temperature and which is in circuit with the electromagnets 42 by way of a suitable signal amplifier (not shown in FIG. 1) to insure that the electromagnets 42 are energized with a certain delay following deenergization of the coil 12. Thus, the electromagnets 42 are energizable upon deenergization of the coil 12 but with such a delay that the valve 35 returns to the phantom-line position 35' only after the cooling of the stator 11 and rotor 20 to a desired temperature is completed. As mentioned above, energization of the coil 12 takes place simultaneously with deenergization of the electromagnets 42 to insure that the stator and rotor of the brake are cooled during the application of a braking action, i.e., when the magnetic field induced by the excited coil 12 produces eddy currents in the rotor 20.

An important advantages of the improved eddy current brake is that the valve 35 is mounted on the stator 11 so that its positions can be determined by actuating means which is also installed in or on the stator. Therefore, the positions of the valve 35 can be determined independently of inertia of rotating parts or other factors which influence the position of a valve on the rotor. Another advantage of such mounting of the valve 35 and of the actuating means therefor is that particles of dirt or other foreign matter which deposit on the rotor are less likely to interfere with movements of the valve between its open and closed positions.

The improved brake is susceptible of many modifications without departing from the spirit of the invention. For example, the armatures of the electromagnets 42 can be designed to pull, rather than push, the adjacent arms of the levers 38 when the valve 35 is to move toward its closed position.

Figure 2:
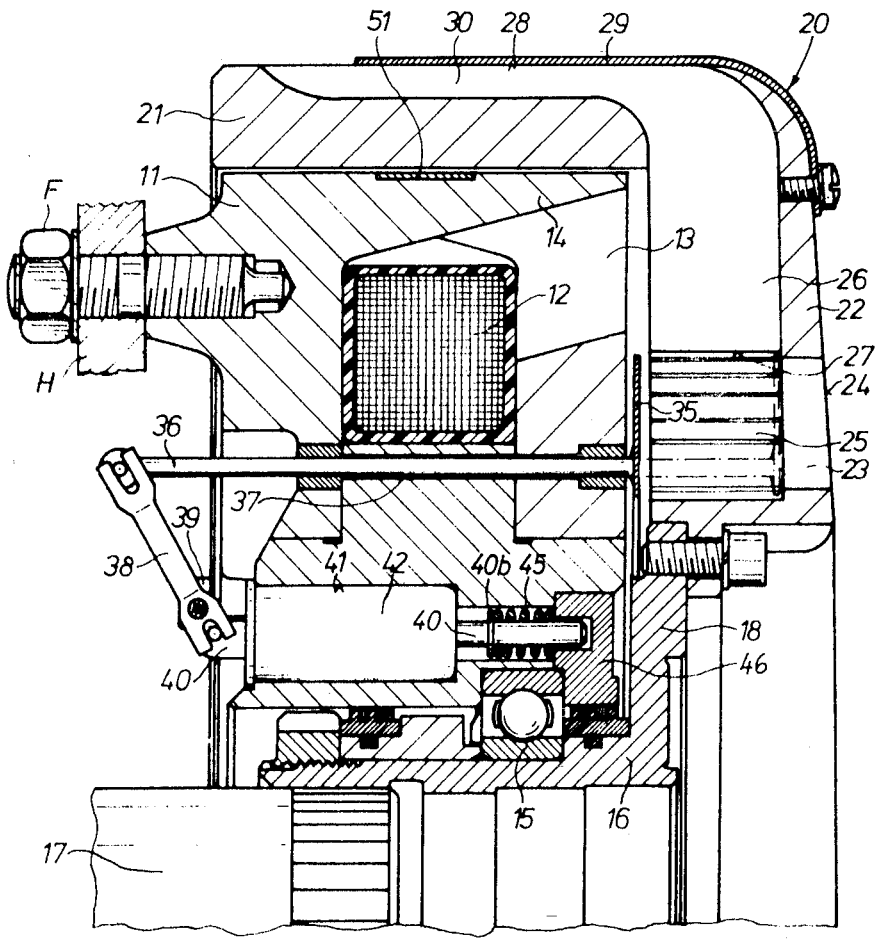
FIG. 2 is a fragmentary axial sectional view of a second eddy current brake wherein the electromagnets of the actuating means must be energized in order to move the valve means to its open position.
Figure 3:
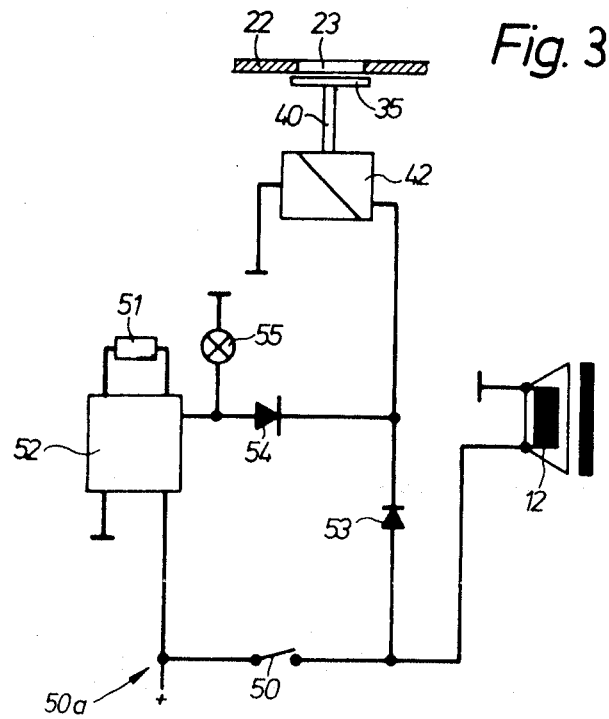
FIG. 3 is a diagram of the electric circuit of the eddy current brake of FIG. 2.

This is shown in FIG. 2 wherein all such parts which are clearly analogous to or identical with the corresponding parts of the eddy current brake shown in FIG. 1 are denoted by similar reference characters. The springs 45 react against a retaining ring 46 for the bearing 15 in the stator 11 and bear against washers 40b on the respective armatures 40 so that they normally urge the armatures in a direction to the left, as viewed in FIG. 2. The levers 38 then cause the rods 36 to move the valve 35 to the closed position which is indicated by phantom lines. The electromagnets 42 are energizable simultaneously with the coil 12 by a control circuit which is shown in FIG. 3. This control circuit includes a starter switch 50 which is closed by the operator of the vehicle when the brake is to apply a braking force to the shaft 17. The electromagnets 42 are energized and cause the linkage including the rods 36 and levers 38 to move the valve 35 to the open position. The time delay means for delaying the deenergization of electromagnets 42 and hence the closing of the valve 35 under the action of the springs 45 comprises a detector 51 which is mounted on one of the pole shoes 14 and measures the temperature of the adjacent parts. When such temperature reaches a predetermined value which indicates that the stator 11 and the rotor 20 are sufficiently cooled by air which is circulated by the vanes 27, the detector 51 produces a signal which is amplified by an amplifier 52 whereby the latter opens the circuit of the electromagnets 42. The positive pole of the energy source which is connectable by starter switch 50 with the electromagnets 42 and coil 12 is indicated at 50a. A first diode 53 is installed in the conductor between the starter switch 50 and electromagnets 42 to prevent the pulse generated by the amplifier 52 from reaching the coil 12. A second diode 54 prevents the current which flows to the windings of the electromagnets 42 when the switch 50 is closed from influencing the amplifier 52. The numeral 55 denotes a signal lamp which is preferably mounted on the dashboard of the vehicle and can be observed by the driver so that the driver is notified that the valve 35 is held in the open position. If desired, the lamp 55 can be caused to light up only when the parts 11, 20 are heated to an elevated temperature which warrants temporary stoppage of the vehicle after a prolonged application of the brake, for example, while the vehicle travels along an elongated downwardly sloping portion of a mountain road.

The detector 51 can constitute an NTC-resistor whose resistance varies in response to heating or cooling.

Figure 4:
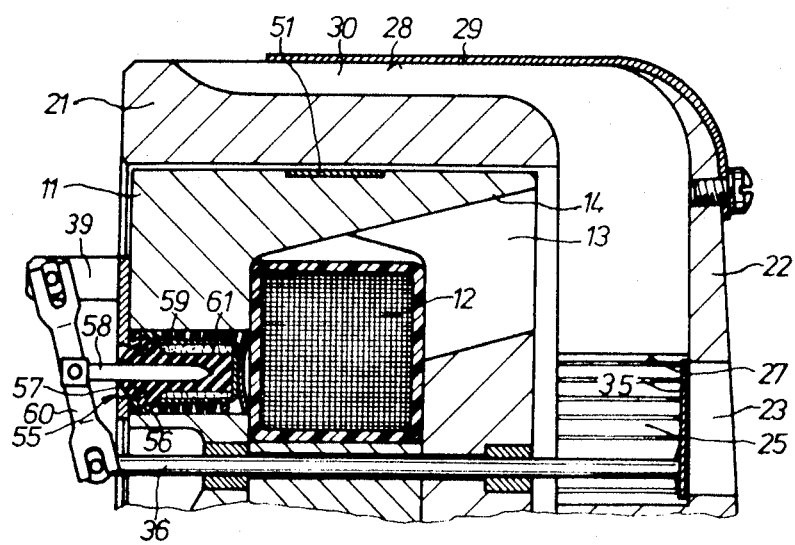
FIG. 4 is a fragmentary axial sectional view of a third eddy current brake wherein the actuating means comprises one or more heat-responsive devices which must be heated in order to move the valve means to its open position.

It is further possible to replace the valve actuating means of FIG. 1 or 2 with an actuating means which comprises one or more temperature-responsive valve displacing devices 55 one of which is shown in FIG. 4. The valve 35 can be moved to its open position in response to heating of a heat-expandible element 61 which is mounted in the stator 11 in the interior of a casing 56 forming part of the device 55. A diaphragm 57 which is at least partially surrounded by the element 61 is connected with a piston 58 which is articulately connected to the median portion of a motion transmitting lever 60. The latter is pivotable with reference to a bearing block 39 and has a bifurcated end portion straddling a pin on a motion transmitting rod 36 coupled to the valve 35. The casing 56 is strongly resistant to deformation and is surrounded by a heating member 59 here shown as a coil of electric resistance wire which is connected with an energy source by the starter switch 50 (not shown in FIG. 4) when the latter completes the circuit of the coil 12. The heat generated by wire 59 then preferably melts the element 61 which expands and pushes the diaphragm 57 in a direction to the right to open the valve 35. The vanes 27 then circulate the coolant which is admitted by way of the inlets 23. That portion of the stator 11 which surrounds the wire 59 and casing 56 serves as a time delay means which insures that the material of the elements 61 sets and contracts with at least some delay following opening of the circuit of the coil 12 and wire 59. This insures that the parts 11, 20 are cooled after the coil 12 is deenergized, preferably for an interval of time which is sufficient to insure that the temperature of the parts 11, 20 drops below a certain value. The diaphragm 57 automatically returns the valve 35 to its closed position when the temperature of the casing 56 drops sufficiently to permit a substantial contraction of the element 61. It is clear that the device 55 can be replaced by one or more temperature-responsive devices which are capable of directly engaging and displacing the valve 35 or one or more valves which perform the functions of the valve 35.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptions should and are intended to be comprehended within the meaning and range of equivalence of the claims.

What is claimed as new and desired to be protected by U.S. Patent is set forth in the appended

What is claimed:

1. In an eddy current brake, particularly for use in automotive vehicles, a combination comprising a stator member; a rotor member rotatable with reference to said stator member; coil means mounted in said stator member and energizable to produce in said rotor member eddy currents with attendant application of a braking force and heating of said members; cooling means comprising coolant-admitting inlet means provided on said rotor member, coolant-circulating means provided on said rotor member to circulate along at least one of said members a coolant which is admitted by way of said inlet means, and valve means provided on said stator member and movable between open and closed positions in which it respectively permits and prevents entry of coolant into the range of said circulating means by way of said inlet means; and actuating means provided on said stator member and operable to move said valve means between said open and closed positions.

2. A combination as defined in claim 1, wherein said valve means is movable axially of said rotor member.

3. A combination as defined in claim 2, wherein said actuating means comprises displacing means and a motion transmitting linkage connecting said displacing means with said valve means.

4. A combination as defined in claim 3, wherein said displacing means comprises at least one electromagnet.

5. A combination as defined in claim 1, wherein said actuating means comprises at least one electromagnet and further comprising control means for energizing said electromagnet, said control means comprising temperature responsive detector means arranged to measure the temperature of at least one of said members and to produce a signal in response to detection of a predetermined temperature, and amplifier means for energizing said electromagnet in response to said signal.

6. A combination as defined in claim 1, wherein said actuating means comprises electromagnet means and motion transmitting means for moving said valve means to said closed position in response to energization of said electromagnet means.

7. A combination as defined in claim 1, wherein said actuating means comprises at least one electromagnet and motion transmitting means for moving said valve means to said closed position in response to deenergization of said electromagnet.

8. A combination as defined in claim 1, wherein said actuating means comprises at least one temperature-responsive device and motion transmitting means for moving said valve means to said open position in response to heating of said device.

9. A combination as defined in claim 8, wherein said device comprises a heat-expansible element and heating means for heating said element in response to energization of said coil means.

10. A combination as defined in claim 1, wherein said stator member is a ring-shaped member and said rotor member is coaxial with and surrounds at least a portion of said stator member, said rotor member having an end wall and said inlet means being provided in said end wall, said end wall further having a chamber communicating with said inlet means in the open position of said valve means and said circulating means being arranged to draw a coolant into said chamber in the open position of said valve means and to expel the thus drawn coolant from said chamber along a plurality of paths wherein the coolant exchanges heat with at least one of said members.

* * * * *